United States Patent Office 3,705,846
Patented Dec. 12, 1972

3,705,846
PRODUCTION OF HYDROGEN IONS AND HYDROXYL IONS BY DECOMPOSITION OF WATER
Masaaki Kato and Sigeta Sato, Kanagawa-ken, Japan, assignors to Asahi Chemical Industry Co., Ltd., Chiyoda-ku, Tokyo, Japan
Filed Dec. 9, 1969, Ser. No. 883,530
Claims priority, application Japan, Dec. 16, 1968, 43/91,561
Int. Cl. B01d 13/02
U.S. Cl. 204—180 P     6 Claims

ABSTRACT OF THE DISCLOSURE

Hydrogen ions and hydroxyl ions are generated economically in an electrodialysis cell comprised of a plurality of anion exchange membranes and cation exchange membranes alternately juxtaposed between a pair of an anode and a cathode by filling aqueous solution or suspension containing at least one electrolyte which is incapable of passing through the ion exchange membrane and is selected from the group consisting of (1) water soluble polyelectrolytes (polymeric electrolytes) having positively charged fixed groups and (2) finely pulverized water insoluble solid electrolytes having positively charged fixed groups, and passing a direct electric current between the electrodes.

PRIOR ART

Heretofore, an acid and an alkali solution have been produced by the decomposition of corresponding salt solution and the electrodialysis of the formed ions in a multicell electrodialysis apparatus provided with a plurality of anion exchange membranes, bipolar ion exchange membranes and cation exchange membranes alternately juxtaposed between a pair of electrodes in the order of anion exchange membrane, bipolar membrane with its cation exchange membrane side toward the anion exchange membrane and with its anion exchange membrane side toward the cation exchange membrane, and cation exchange membrane consecutively, as disclosed in Japanese patent publication No. 3962/1957. Bipolar ion exchange membranes usually refer to the composite ion exchange membranes having cation exchange groups on one side and anion exchange groups on the other side, usually prepared by lining or bonding cation exchange membrane and anion exchange membrane together.

In said Japanese patent publication were used bipolar ion exchange membranes prepared by bonding a cation exchange membrane, which had been prepared by pulverizing Amberlite IR-120 to fine powders and rolling the powders to a film by means of polyvinyl chloride resins as a binder, with an anion exchange membrane, which has been prepared by pulverizing Amberlite IRA-410 to fine powders and rolling the powders to a film by means of polyvinyl chloride resins as a binder, by means of polyethylene imine and epichlorohydrin, and curing the thus bonded membranes.

Another Japanese patent publication No. 14531/60 proposed the use of bipolar ion-exchange resin membranes prepared by kneading finely powdered anion or cation exchange resins and thermoplastic, electro-insulating resins by help of a suitable solvent, making them plastic, rolling them to a single cation or anion exchange membrane, applying a paste mixture of finely powdered strongly acidic or strongly basic ion exchange resin and a thermoplastic, electro-insulating resin solution to one side each of the thus prepared cation and anion exchange membranes, placing the applied surface upon the other applied surface, rolling and bonding the membranes placed one upon another in a plastic state by pressing, and then removing the solvent used therefrom.

Still another Japanese patent publication No. 16633/63 proposed the use of bipolar ion-exchange resin membranes prepared by applying a mixture of partially polymerized vinyl pyridine and epoxy resins to a cation exchange membrane, and applying irradiation of radioactive rays thereto during the curing.

However, all of these well-known methods are based on a bipolar membrane prepared by bonding a cation exchange membrane to an anion exchange membrane by their specific procedures. Owing to the difficulty in bonding technique, high manufacturing cost of the bipolar membranes, and unsatisfactory properties of the thus obtained bipolar membranes, which will be mentioned later, it cannot be said that these well-known methods can provide a satisfactory industrial technique.

That is to say, Japanese patent publication No. 3962/57 discloses an example of the use of 0.5 N NaCl in a cell compartment at one unit cell voltage of 2.9 volt and a current density of 2.1 amp./cm.$^2$ and $\eta_H$=43.08% and $\eta_{OH}$=52.36%, but both voltage and current efficiency are not so good.

Japanese patent publication No. 14,531/60 discloses an example for producing 0.5 N NaOH and 0.5 N HCl at a bipolar membrane voltage of 2.57 volt and a current density of 3 amp./dm.$^2$ with $\eta_H=\eta_{OH}$=85%. Though the voltage and the current density are more improved than in Japanese patent publication No. 3162/57, it cannot be said that these properties are much better.

Same things are likewise applied to Japanese patent publication No. 16,633/63. Even apart from these properties, one of disadvantages of the conventional bipolar membrane techniques so far proposed is a short life of the composite membranes. That is to say, when the electrodialysis is continued for a prolonged period of time, peeling takes place at the bonded surfaces of the bipolar membranes or at the applied surface partially or entirely, and as a result, an increase in voltage and a decrease in current efficiency are brought about.

Conclusively, it is apparent that the formation of an acid solution and an alkali solution from the corresponding salt solution in an electrodialysis cell in which bipolar ion exchange membranes are used always suffers from the disadvantages due to the following deficiencies of the bipolar ion exchange membranes.

(a) short life,
(b) technical difficulty and uneconomy in preparing bipolar membranes, and
(c) insufficient electrochemical and physical properties.

This invention relates to a method for generating hydrogen ions and hydroxyl ions and more particularly to a method for producing an acid and an alkali by the ionic separation of water and electrodialysis of the formed ions by passing direct electric current through a system where an aqueous solution or suspension containing at least one electrolyte which does not pass through ion exchange resin membranes and is selected from the group consisting of (1) water soluble polyelectrolytes (polymeric electrolytes) having positively charged fixed groups and (2) finely pulverized water insoluble solid electrolytes having positively charged fixed groups, is filled between a cation exchange membrane and an anion exchange membrane.

A principal object of the present invention is to provide a novel method for generating and obtaining hydrogen ions and hydroxyl ions at a low cost.

A further object of the present invention is to provide an improved method for preparing an acid and an alkali by the decomposition of water in a multicell electrodialysis apparatus without using bipolar ion exchange membranes, at a low cost.

In accordance with the present invention, a plurality of water decomposition compartments as systems for decomposing water under the effect of direct electric current are formed between electrodes.

In accordance with the present invention, water is decomposed into $H^+$ and $OH^-$ in a system by applying direct electric current therethrough, in which system is present an aqueous solution or suspension which does not pass through ion exchange membranes and is selected from the group consisting of (1) water soluble polyelectrolytes having positively charged fixed groups and (2) finely pulverized water insoluble solid electrolytes having positively charged fixed groups. The presence of above-mentioned electrolyte with water in the system enables the decomposition of water and the stable electrodialysis over a prolonged period at a very high efficiency.

Further in accordance with the present invention, an acid and an alkali solution are economically prepared by the decomposition of water and salt and electrodialysis of the formed ions through ion exchange memberanes in a multi-cell electrodialysis apparatus by the application of D.C. voltage through the apparatus in which a plurality of salt compartments, acid compartments, water decomposition compartments, and alkali compartments are provided between a pair of electrodes by alternately juxtaposing a plurality of cation exchange membranes and anion exchange membranes between a cathode and an anode, with an anion exchange membrane forming an end membrane on the cathode side and a cation exchange membrane forming an end membrane on the anode side, said compartments, arranged in the consecutive order of a salt compartment, an acid compartment, a water decomposition compartment and an alkali compartment repeatedly from the cathode side toward the anode side, said water decomposition compartments being filled with an aqueous solution or suspension containing at least one electrolyte which does not pass through ion exchange membranes and is selected from the group consisting (1) water soluble polyelectrolytes having positively charged fixed groups and (2) finely pulverized water insoluble solid electrolytes having positively charged fixed groups.

DESCRIPTION

The present invention will be now explained in detail with reference to the accompanying drawings.

Figure 1:
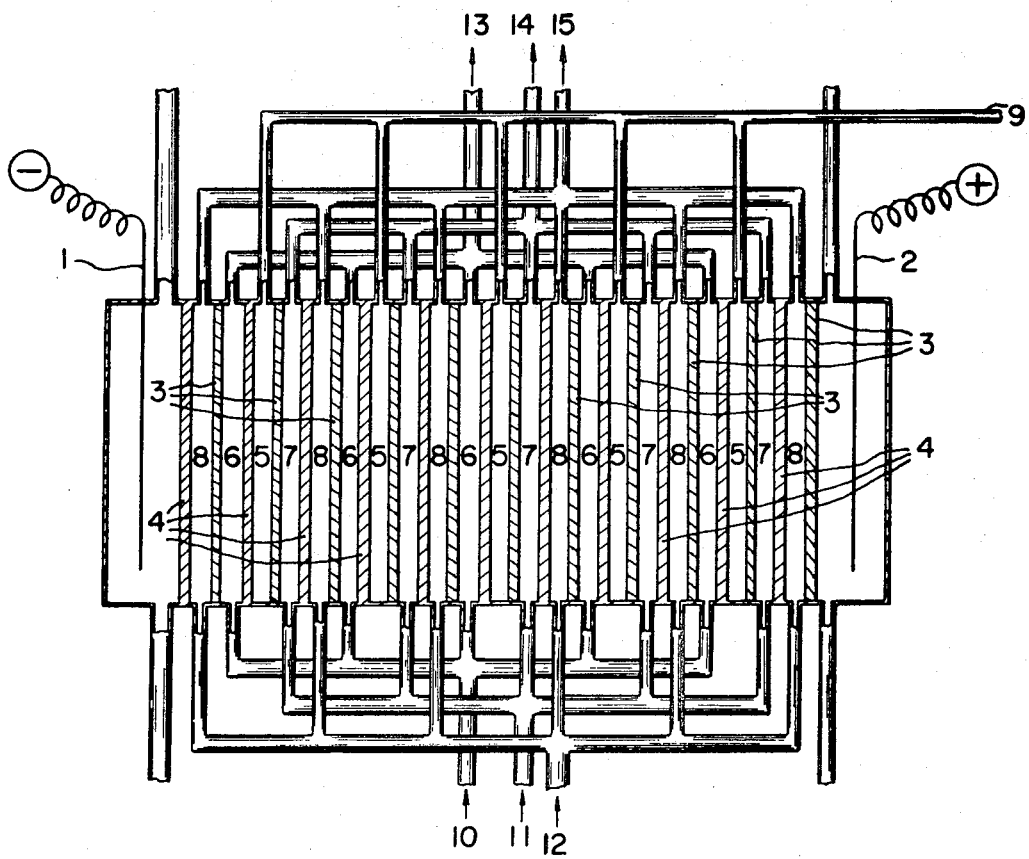
FIG. 1 is a schematic view of one embodiment of an apparatus for carrying out the present invention.

In FIG. 1, an embodiment of a method for producing an acid and an alkali according to the present invention is illustrated. That is, a plurality of anion exchange membranes 3 and cation exchange membrane 4 are alternately juxtaposed at a predetermined membrane distance between a pair of a cathode 1 consisting of such a suitable cathode material as graphite, iron, nickel, stainless steel or the like, and an anode 2 consisting of such a suitable anode material as graphite, platinum, titanium, tantalum or zirconium coated with such a noble metal as platinum etc., to form a plurality of water decomposition compartments 5, acid compartments 6, alkali compartments 7 and salt compartments 8, in the order of 8, 6, 5, 7, 8, 6, 5, 7 . . . from the cathode towards the anode, where the membranes from partitions between the compartments, i.e. salt compartments 8 and water decomposition compartments 5 have cation exchange membranes 4 on the cathode sides thereof and anion exchange membranes 3 on the anode sides thereof, while acid compartments 6 and alkali compartments 7 have anion exchange membranes 3 on the cathode sides thereof and cation exchange membranes 4 on the anode sides thereof.

An aqueous solution or suspension containing at least one electrolyte which does not pass through ion exchange membrane and is selected from the group consisting of (1) water soluble polyelectrolyte having positively charged fixed groups and (2) finely pulverized water insoluble solid electrolytes having positively charged fixed groups, is filled in the water decomposition compartments 5. Water or an aqueous acidic solution is fed to the acid compartment 6 from a common feed pipe 10, water or an aqueous alkaline solution is fed to the alkali compartments 7 from a common feed pipe 11, and an aqueous solution of organic salt or inorganic salt is fed to the salt compartments 8 from a common feed pipe 12.

A D.C. voltage is applied between the cathode and the anode provided at both ends to pass direct electric current in a direction to allow it to flow from the anion exchange membrane side of the water decomposition compartment toward the cation exchange membrane side of the water decomposition compartment, in the apparatus.

On and during the application of D.C. voltage through the apparatus, the hydrogen ions $H^+$ and the hydroxyl ions $OH^-$ are generated in the water decomposition compartment 5, while salt in each of said salt compartments 8 is decomposed into corresponding anions and cations.

The hydrogen ions $H^+$ thus formed in the water decomposition compartment 5 travel through the cation exchange membrane 4 forming a partition on the cathode side of the water compartment 5, into the adjacent acid compartment 6 while anions formed in the salt compartment 8 travel through the anion exchange membrane forming a partition on the anode side of the salt compartment by electrodialysis into the adjacent acid compartment, whereby an acid is formed in each of the acid compartments.

On the other hand, the hydroxyl ions $OH^-$ formed within the water decomposition compartment 5 travel through the anion exchange membrane forming a partition on the anode side of the water decomposition compartment 5 into the adjacent alkali compartment 7 by electrodialysis, while the cations formed within the salt compartment 8 travel through the cation exchange membrane forming a partition on the cathode side of the salt compartment 8 into the adjacent alkali compartment 7, whereby an alkali is formed within each of the alkali compartment 7.

In the meantime, water is consumed in the water decomposition compartments 5 by passing an electric current due to the decomposition of water and electrodialysis, and thus water must be supplied to the water decomposition compartments 5 by a suitable means, for example, through a pipe 9 connecting to the water decomposition compartments 5. According to another means, the water within the water decomposition compartments 5 is circulated between a water circulating tank provided outside the electrodialysis cell and the water decomposition compartments 5 and a corresponding amount of water to the water loss due to the decomposition and electrodialysis is supplied to the water circulating tank.

The solutions passed through the acid compartments 6, alkali compartments 7 and salt compartments 8 individually are led to the outside of the electrodialysis cell through the respective common discharge pipes 13, 14 and 15 correspondingly.

When a strong acid and a strong base are to be prepared by decomposing such a strong acid-strong base type salt as NaCl, an electrodialysis cell having such a structure as explained above is necessary, but when a salt of weak acid or weak base is to be decomposed, the structure of the electrolysis cell can be much simplified.

For example, when sodium acetate is to be decomposed, it is not necessary to inhibit the traveling of the hydrogen ions by means of the anion exchange membrane, because the formed acetic acid is a weak acid. Thus, only a cation exchange membrane is placed between a water decomposition compartment and the next water decomposition compartment, and the anion exchange membrane can be omitted from between said compartments. By carrying out electrodialysis while an aqueous sodium acetate solution is passed to the compartments which are adjacent to the water decomposition compartments on the cathode side thereof and receive the hydrogen ions, the salt compartments can serve as the acid compartments at the same time, and acetic acid can be accumulated in the salt compartments.

When a salt of weak base is to be decomposed, a cation exchange membrane is omitted from between a water decomposition compartments and the next water decomposition compartment and only an anion exchange membrane is inserted therebetween, contrary to the decomposition of a salt of weak acid. In these cases, one kind of compartments can be saved, and consequently, one piping system as well as one storage vessel system can be saved.

The concentration of polymeric electrolytes in the aqueous solution or the concentration of solid electrolytes in the suspension is usually at least 1% by weight, preferably at least 5% by weight.

The upper limit of the amount is determined by economic considerations and operational parameters.

Therefore, the decomposition of water may effectively proceed with a considerable amount of said electrolytes, the use of a greater amount of them is usually not economically attractive.

Even if the polyelectrolytes such as proteins have both negatively and positively charged fixed groups, it can be employed so long as the fixed groups of the polyelectrolyte is predominantly in a positive state under the service conditions.

It can be presumed that water molecules are decomposed, and $H^+$ and $OH^-$ are generated at the membrane boundary surfaces between the cation exchange membranes 4 constituting one partition wall of the water decomposition compartments 5 and the aqueous solution or suspension in contact with the membranes.

As the electrolytes which do not pass through the ion exchange membrane, as said water-soluble polyelectrolytes, those having linear structures or slightly cross-linked structures are suitable.

For example, polyvinylbenzyltrimethylammonium hydroxide and salts thereof, such as halides and sulfates, quaternized polyvinyl pyridine, poly - N - methylolacrylamide, polyethylene imine can be used.

As said finely pulverized water insoluble solid electrolytes capable of forming a solid electrolyte suspension in water as a medium, finely powdered anion exchange resins can be used. For example, such anion exchange resins pulverized by a ball mill, sand mill, roll mill, attritor mill or other pulverizer to less than several ten microns, preferably less than several microns, as Amberlite IRA–400, IRA–401, IRA–402, IRA–405, IRA–900, IRA–904, IRA–410, IRA–411, IRA–911, and IRA–910, and Diaion SA10A and PA304, etc. can be used.

Thus, any inorganic salts and organic salts, in conjunction with hydrogen ions $H^+$ and hydroxyl ions $OH^-$, can be converted into corresponding acid and alkali, respectively so long as the salt, and formed ions do not adversely affect the electrodialysis.

Applications of the present method for generating hydrogen ions and hydroxyl ions to the industries cover quite a wide field. As will be explained in the following examples, production of NaOH and HCl from NaCl, production of $CH_3COOH$ and NaOH from $CH_3COONa$, production of $NH_4OH$ and HCl from $NH_4Cl$, and many other applications can be enumerated, based on the enhanced decomposition of water into hydrogen ions $H^+$ and hydroxyl ions $OH^-$ by the promoting effect of said electrolyte.

EXAMPLES

All the ion exchange membranes used in the following examples are Types CK–1 (cation exchange membrane) and CA–1 (anion exchange membrane) made by Asahi Kasei Kogyo K.K. Japan, which have been prepared from polymeric styrene divinyl benzene as a matrix, into which sulfonic group and quaternary ammonium group have been introduced.

EXAMPLE 1

Preparation of polyvinylbenzyltrimethyl ammonium chloride

1% benzoyl peroxide was added as a polymerization catalyst to a 20% toluene solution of chloromethylated styrene synthesized from vinyltoluene and chlorine, and polymerization was effected at 60° C. for 48 hours.

The thus prepared polymerization solution was added dropwise to methanol to precipitate polychloromethylated styrene. The precipitates were filtered off, collected and vacuum-dried at room temperature.

On the other hand, trimethylamine was injected to benzene for absorption, whereby a benzene solution of trimethylamine corresponding to 29% trimethylamine concentration was prepared.

Polychloromethylated styrene corresponding to 5% polychloromethylated styrene concentration was dissolved in the benzene solution of trimethylamine and amination reaction was carried out at 50° C. for 24 hours.

The aminated polychloromethylated styrene became insoluble in benzene and thus was deposited. The resulting precipitates were filtered off, collected, washed with benzene and vacuum-dried at room temperature, whereby polyvinylbenzyltrimethyl-ammonium chloride was prepared.

Electrodialysis

A 20% aqueous solution of polyvinylbenzyltrimethylammonium chloride was filled in water decomposition compartments whose partitioning anion exchange membranes were fixed towards the anode side and whose partitioning cation exchange membranes were placed on the cathode sides. A 0.5 N—NaOH solution was placed in the compartment at the outside of the anion exchange membrane of the water decomposition compartment and a 0.5 N —HCl solution was placed in the compartment at the outsides of the cation exchange membrane of the water decomposition compartment. A direct electric current was passed at a current density of 3 amp./dm.$^2$ through the cell to effect electrodialysis. The transport numbers were measured. That is, such data were obtained, as the $H^+$ (or $OH^-$) ion transport number was 0.914 (which corresponded to the current efficiency), the $Na^+$ ion transport number was 0.048 and the $Cl^-$ ion transport number was 0.038.

As electrode materials a platinum anode and a silver chloride cathode were used.

Pure water was added to the water decomposition compartments only in an amount corresponding to the water loss during the electrodialysis. The effective current-passing was 18 cm.$^2$/per sheet.

Figure 2:
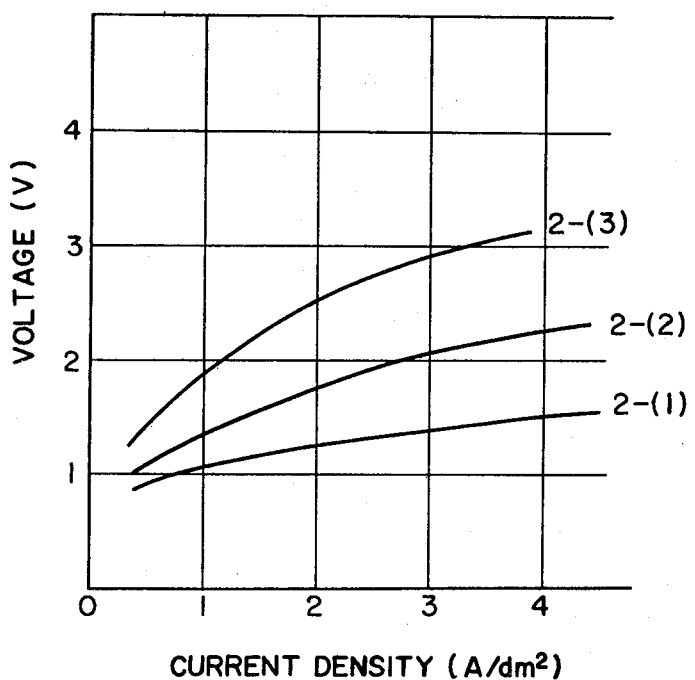
FIGS. 2 and 3 are diagrams illustrating several embodiments of the present invention.

The voltages applied to the water decomposition compartments having a membrane distance of 0.75 mm. is shown in FIG. 2 as a curve 2-(1).

The measurement of the voltage was effected by placing an alkaline sodium chloride solution containing NaOH in 0.4 N and NaCl in 0.1 N in the compartments at the outsides of the anion exchange membranes of the water decomposition compartments, the former solution being isolated from the latter with a cation exchange membrane interposed therebetween, placing an acidic sodium chloride solution containing HCl in 0.4 N and NaCl in 0.1 N in the compartments at the outsides of the cation exchange membranes of the water decomposition compartments, the former solution being isolated from the latter with an anion exchange membrane interposed therebetween, passing the direct electric current through the cell while allowing these solutions in these compartments to be renewed and measuring a potential difference between the silver chloride electrodes provided near the membrane surfaces by means of a vacuum tube-type potentiometer.

The change in voltage with the current density is given in FIG. 2 as a curve 2-(1).

EXAMPLE 2

Anion exchange resins (Diaion PK–304, manufactured by Mitsubishi Kasei K. K. Japan) was pulverized to fine particles in a ball mill for 100 hours, and suspended in water at a rate of 0.5 equivalent exchange capacity 1 l. The thus prepared suspension was filled in the water decomposition compartments and the transport numbers were measured by passing the current under the same conditions as in Example 1.

The transport number of $H^+$ ions ($OH^-$ ions) was 0.926, that of $Na^+$ ions 0.041 and that of $Cl^-$ ions 0.038.

The change in voltage with the current density is given in FIG. 2 as a curve 2-(2).

EXAMPLE 3

0.5 g. of sodium phosphate was added to 100 ml. of a 16.5% polyethylene imine aqueous solution and left to stand for 24 hours. The thus prepared aqueous solution was filled in the water decomposition compartments and their transport numbers were measured by effecting electrolysis under the same conditions as in Example 1.

The transport number of $H^+$ ions was 0.912, that of $Na^+$ ion 0.051 and that of $Cl^-$ ion 0.037.

The change in voltage with the current density is given in FIG. 2 as a curve 2-(3).

EXAMPLE 4

Figure 3:
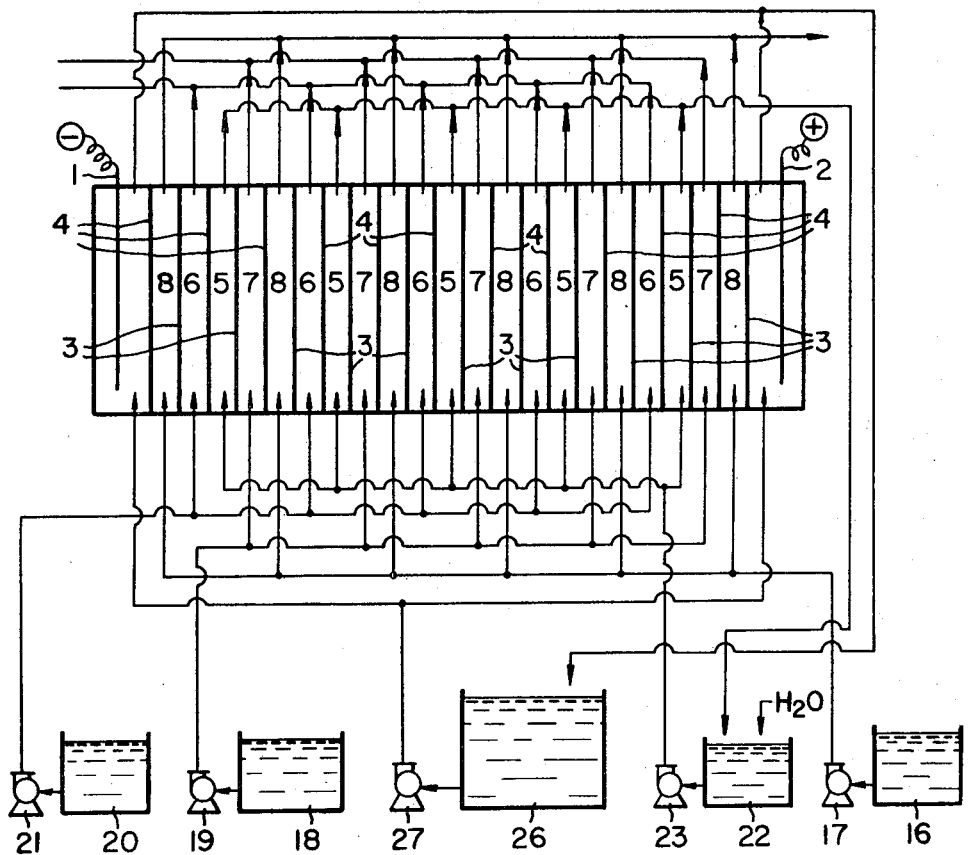

The apparatus together with other facilities as shown diagrammatically in FIG. 3 was used.

Anion exchange membranes 3 and cation exchange membranes 4, each having an effective current-passing area of 6 cm. x 40 cm., were juxtaposed alternately at a membrane distance of 0.75 mm., as shown in FIG. 3, whereby six salt compartments 8, five water decomposition compartments 5, five acid compartments 6 and five alkali compartments 7 were formed between a cathode 1 and an anode 2 in the order of 1, 8, 6, 5, 7, 8, 6 . . . 5, 7, 8 and 2. A 1.0 mm.-thick titanium plate plated with 5 micron-thick platinum was used as an anode 2, and 2.0 mm.—thick stainless steel plate was used as a cathode 1. A multi compartment electrodialysis apparatus was assembled from said elements and tests were conducted in the following manner.

A 0.579 N—NaCl solution was fed to the salt compartments 8 from a salt water feed tank 16 provided outside the dialysis apparatus by means of a salt water feed pump 17. A 0.213 N—NaOH solution was fed to the alkali compartments 7 from an alkali feed tank 18 by means of an alkali feed pump 19. A 0.198 N—HCl solution was fed to the acid compartments 6 from an acid feed tank 20 by means of an acid feed pump 21.

A 15% aqueous solution of polyvinylbenzyltrimethylammonium chloride as prepared in Example 1 was fed to the water decomposition compartments 5 from a polyelectrolyte solution circulation tank 22 by means of a polyelectrolyte solution circulation pump 23, and the solution leaving the water decomposition compartments 5 was allowed to return to the polyelectrolyte solution circulation tank 22. Water was supplied to the tank in an amount corresponding to water loss due to the decomposition of water, etc.

Tests were conducted by setting flow rates of the solution passing through the acid compartments, alkali compartments and salt compartments to the following values while keeping the linear velocity of the flow of the polymeric electrolyte solution through the water decomposition compartments 5 constantly at 0.017 cm./sec. and keeping the direct current passing between both electrodes constantly at 7.2 amp. (3 amp./dm.²) for 65.5 hrs. while the concentrations and flow rate conditions of the respective feed solutions are given below.

A 0.5 N—$Na_2SO_4$ solution, whose pH was adjusted to 2, was circulated between electrode compartments 24 and 25 at both ends and a electrode solution circulation tank 26 by means of an electrode circulation pump 27.

Constantly stabilized operation could be carried out with the following results.

| | |
|---|---|
| Voltage between both end membranes | 11.2 volt. |
| Effluent concentration ($H^+$) of acid compartment | 0.389 N. |
| Effluent concentration ($OH^-$) of alkali compartment | 0.767 N. |
| Effluent concentration ($Cl^-$) of salt compartment | 0.484 N. |
| Acid current efficiency ($H^+$) | 88.5%. |
| Alkali current efficiency ($OH^-$) | 90.3%. |
| Flow velocity within the compartment: | |
|    Acid compartment | 0.767 cm./sec. |
|    Alkali compartment | 0.270 cm./sec. |
|    Salt compartment | 1.346 cm./sec. |
| Effluent concentration of the compartment: | |
|    Acid compartment ($H^+$) | 0.373 N. |
|    Alkali compartment ($OH^-$) | 0.747 N. |
|    Salt compartment ($Cl^-$) | 0.493 N. |
| Current efficiency in the compartment: | |
|    Acid compartment | 89.0%. |
|    Alkali compartment | 93.6%. |

EXAMPLE 5

Electrodialysis was conducted by using the apparatus as mentioned in Example 4, except that the anion exchange membranes between the acid compartments and the salt compartments have been eliminated to integrate the acid compartments and the salt compartments (the integrated compartments will be referred to in this example as "acid compartments").

A 2.20 N—$CH_3COONa$ solution was fed to the acid compartments and a 0.11 N NaOH solution was fed to the alkali compartments. A 20% aqueous solution of polyvinyl benzyltrimethylammonium chloride prepared in Example 1 was fed at a flow velocity of 0.017 cm./sec. to the water decomposition compartments 5 and the effluent solution leaving the water decomposition compartments was made to be returned to tank 22. Water was supplied to tank 22 in an amount corresponding to the water loss due to the decomposition of water, etc.

By passing a direct current of 7.2 amp. (3 amp./dm.²) between the anode and the cathode and adjusting the flow rates of the alkali compartment solution and the acid compartment solution so that the NaOH concentration of the alkali compartment effluent solution and the $CH_3COOH$ concentration of the acid compartment effluent solution might be 0.5 N and 1.02 N respectively, such a result as $\eta_H = \eta_{OH} = 85.1\%$ was obtained. The voltage applied to both end membranes was 11.0 volts.

We claim:

1. A method for generating acid and alkali by electrodialysis in a cell comprised of a plurality of cation exchange membranes and anion exchange membranes alternately juxtaposed at a predetermined membrane distance between a pair of an anode and a cathode, the cathode side end membrane being a cation exchange membrane and the anode side end membrane being an anion exchange membrane, which comprises supplying an aqueous solution of a salt, an aqueous solution of an acid, an aqueous suspension containing a finely pulverized water insoluble solid electrolyte having positively charged fixed groups, and an aqueous solution of alkali, separately and respectively to a plurality of salt compartments, acid compartments, water decomposition compartments and alkali compartments, and passing a direct electric current between the cathode and the anode in a direction which allows the direct electric current to flow from the cation exchange membranes toward the anion exchange membranes in said water decomposition compartments whereby water in said water decomposition compartment is decomposed into hydrogen ions $H^+$ and hydroxyl ions $OH^-$, an acid is formed in said acid compartments and an alkali is formed in said alkali compartments, each of said salt compartments and water decomposition compartments being constructed of a cation exchange membrane on the cathode side and an anion exchange membrane on the anode side and two of said salt compartments forming end compartments adjacent to the electrode, each of said acid compartments and alkali compartments being constructed of an anion exchange membrane on the cathode side and a cation exchange membrane on the anode side, said salt compartment, said acid compartment, said water decomposition compartment and said alkali compartment being consecuted in this order repeatedly from the cathode side toward the anode side.

2. A method according to claim 1, wherein said solid electrolytes are pulverized anion exchange resins.

3. A method according to claim 1, wherein at least 1% by weight of the solid electrolytes is contained in said suspension.

4. A method for generating hydrogen ions and hydroxyl ions by the ionic separation of water which comprises passing a direct electric current through an aqueous suspension containing finely pulverized water insoluble solid electrolytes having positively charged fixed groups and obtaining hydrogen ions $H^+$ out of said aqueous suspension by electrodialysis of the hydrogen ions $H^+$ through a cation exchange membrane placed on the cathode side of said aqueous suspension and hydroxyl ions $OH^-$ out of said suspension by electrodialysis of the hydroxyl ions $OH^-$ through an anion exchange membrane placed on the anode side of said aqueous suspension.

5. A method according to claim 4, wherein said solid electrolytes are pulverized anion exchange resins.

6. A method according to claim 4, wherein at least 1% by weight of said solid, electrolyte is contained in said aqueous suspension.

References Cited

UNITED STATES PATENTS

| | | | |
|---|---|---|---|
| 2,721,171 | 10/1955 | Arnold et al. | 204—180 P |
| 2,815,320 | 12/1957 | Kollsman | 204—180 P |
| 2,923,674 | 2/1960 | Kressman | 204—180 P |
| 3,291,713 | 12/1966 | Parsi | 204—180 P |
| 3,330,750 | 7/1967 | McRae et al. | 204—180 P |

FOREIGN PATENTS

| | | | |
|---|---|---|---|
| 212,364 | 2/1957 | Australia | 204—180 P |
| 236,144 | 12/1958 | Australia | 204—180 P |

JOHN H. MACK, Primary Examiner

A. C. PRESCOTT, Assistant Examiner

U.S. Cl. X.R.

204—180 B